United States Patent
Ramarathnam

(10) Patent No.: US 11,760,491 B1
(45) Date of Patent: Sep. 19, 2023

(54) TWO-PIECE MACHINE LEG ASSEMBLY FOR PASSENGER SEATS

(71) Applicant: Safran Seats USA LLC, Gainesville, TX (US)

(72) Inventor: Gokul Ramarathnam, Irvine, CA (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/686,610

(22) Filed: Mar. 4, 2022

(51) Int. Cl.
*B64D 11/06* (2006.01)

(52) U.S. Cl.
CPC ...... *B64D 11/0648* (2014.12); *B64D 11/0649* (2014.12)

(58) Field of Classification Search
CPC .................................................. B64D 11/0648
See application file for complete search history.

(56) References Cited

U.S. PATENT DOCUMENTS

| | | | | |
|---|---|---|---|---|
| 5,152,578 | A * | 10/1992 | Kiguchi | B60N 2/045 188/371 |
| 5,553,923 | A | 9/1996 | Bilezikjian | |
| 5,657,950 | A * | 8/1997 | Han | B64D 11/064 297/216.2 |
| 10,501,189 | B2 | 12/2019 | Malligere et al. | |
| 11,027,847 | B2 * | 6/2021 | Itzinger | B60N 2/3093 |
| 11,352,144 | B2 * | 6/2022 | Murnan | B60N 2/68 |
| 2011/0101162 | A1 * | 5/2011 | Zimmermann | B64D 11/0693 244/118.6 |
| 2019/0092476 | A1 * | 3/2019 | Gross | B64D 11/0696 |
| 2019/0329892 | A1 * | 10/2019 | Roth | B64D 11/0696 |
| 2020/0086995 | A1 | 3/2020 | Cheung | |
| 2021/0387732 | A1 * | 12/2021 | Salzer | B64D 11/0648 |

FOREIGN PATENT DOCUMENTS

| | | | | |
|---|---|---|---|---|
| CZ | 2018387 | A3 * | 2/2020 | |
| DE | 102016124409 | A1 * | 6/2018 | |
| DE | 102019127049 | A1 * | 4/2021 | B64D 11/0648 |
| DE | 102020106035 | A1 * | 9/2021 | B64D 11/0636 |
| WO | WO-9420327 | A1 * | 9/1994 | B64D 11/0624 |
| WO | WO-2018106767 | A1 * | 6/2018 | B60N 2/045 |
| WO | WO-2021066792 | A1 * | 4/2021 | B60N 2/12 |
| WO | WO-2022256013 | A1 * | 12/2022 | |

OTHER PUBLICATIONS

International Patent Application No. PCT/US2023/013249, International Search Report and Written Opinion, dated May 24, 2023.

* cited by examiner

*Primary Examiner* — Timothy J Brindley
(74) *Attorney, Agent, or Firm* — Kilpatrick Townsend & Stockton LLP

(57) ABSTRACT

A leg assembly for a passenger seat for a vehicle such as an aircraft includes a forward leg and an aft leg. The forward leg includes a top end and a bottom end opposite the top end, and the top end of the forward leg includes a forward aperture for receiving a first base frame tube of the passenger seat. The aft leg includes a top end, a bottom end, a forward side, and an aft side, and the top end of the aft leg includes an aft aperture for receiving a second base frame tube of the passenger seat. The forward side at the aft aperture of the aft leg may be a forward-most portion of the aft leg, and the aft leg is indirectly connected to the forward leg.

18 Claims, 3 Drawing Sheets

TWO-PIECE MACHINE LEG ASSEMBLY FOR PASSENGER SEATS

FIELD OF THE INVENTION

The field of the invention relates to passenger seats, and, more particularly, to leg assemblies for passenger seats.

BACKGROUND

Passenger vehicles, such as aircraft, buses, trains, ships, and automobiles, often include one or more passenger seats in which passengers may be seated and otherwise use during travel. A passenger seat may include a leg assembly that connects the passenger seat to a base of the passenger vehicle, such as a floor, track, etc. Traditionally, such leg assemblies have been a single-piece construction. Such leg assemblies are difficult to optimize to different load cases for the passenger seat and generate significant material waste during manufacturing.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a leg assembly for a passenger seat includes a forward leg and an aft leg. The forward leg includes a top end and a bottom end opposite the top end, and the top end includes a forward aperture adapted to receive a first base frame tube of the passenger seat. The aft leg includes a top end, a bottom end, a forward side, and an aft side, and the top end comprises an aft aperture adapted to receive a second base frame tube of the passenger seat. In some embodiments, the forward side at the aft aperture of the aft leg is a forward-most portion of the aft leg, and the aft leg is indirectly connected to the forward leg.

In certain embodiments, a distance between the forward side and the aft side at the aft aperture is a maximum thickness of the aft leg. In some embodiments, the bottom end of the aft leg is offset in an aft direction relative to the top end of the aft leg. The aft side of the aft leg may be linear between the top end and the bottom end or may have a non-linear curvature between the top end and the bottom end.

In some embodiments, the forward leg further comprises a forward side and an aft side, wherein a distance between the forward side and the aft side at the forward aperture of the forward leg is a maximum thickness of the forward leg.

In certain embodiments, the forward leg and the aft leg each comprise an aluminum alloy. In some cases, the aft side of the aft leg may include a non-linear curvature between the top end and the bottom end.

The bottom end of the forward leg optionally may be vertically aligned with the top end of the forward leg. In various embodiments, the aft leg includes a uniform thickness between the aft aperture and the bottom end.

In certain embodiments, a transverse dimension of the forward aperture is the same as a transverse dimension of the aft aperture. In some embodiments, the forward leg includes a non-uniform thickness between the top end and the bottom end. Optionally, the aft leg may include a non-uniform thickness between the aft aperture and the bottom end.

According to certain embodiments, a passenger seat may include the leg assembly. In some embodiments, the passenger seat also includes the first base frame tube, the second base frame tube, and a spreader coupled to the first based frame tube and the second base frame tube.

According to certain embodiments of the present invention, a leg assembly for a passenger seat includes a forward leg having a top end and a bottom end opposite the top end. The top end includes a forward aperture adapted to receive a first base frame tube of the passenger seat. The leg assembly also includes an aft leg having a top end, a bottom end, a forward side, and an aft side, where the top end includes an aft aperture adapted to receive a second base frame tube of the passenger seat. In some embodiments, a distance between the forward side and the aft side at the aft aperture is a maximum thickness of the aft leg. The aft leg is indirectly connected to the forward leg.

In various embodiments, the bottom end of the aft leg is offset in an aft direction relative to the top end of the aft leg. In some embodiments, the aft side of the aft leg is linear between the top end and the bottom end, or the aft side of the aft leg includes a non-linear curvature between the top end and the bottom end.

According to certain embodiments of the present invention, a leg assembly for a passenger seat includes a forward leg and an aft leg. The forward leg includes a top end and a bottom end opposite the top end, and the top end includes a forward aperture adapted to receive a first base frame tube of the passenger seat. The aft leg includes a top end, a bottom end, a forward side, and an aft side, where the top end includes an aft aperture adapted to receive a second base frame tube of the passenger seat. In some embodiments, a distance between the forward side and the aft side at the aft aperture is a maximum thickness of the aft leg, and the forward side at the aft aperture of the aft leg is a forward-most portion of the aft leg.

In some embodiments, a passenger seat includes the leg assembly, the first base frame tube, the second base frame tube, and a spreader connecting the first base frame tube with the second base frame tube.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

Figure 1:
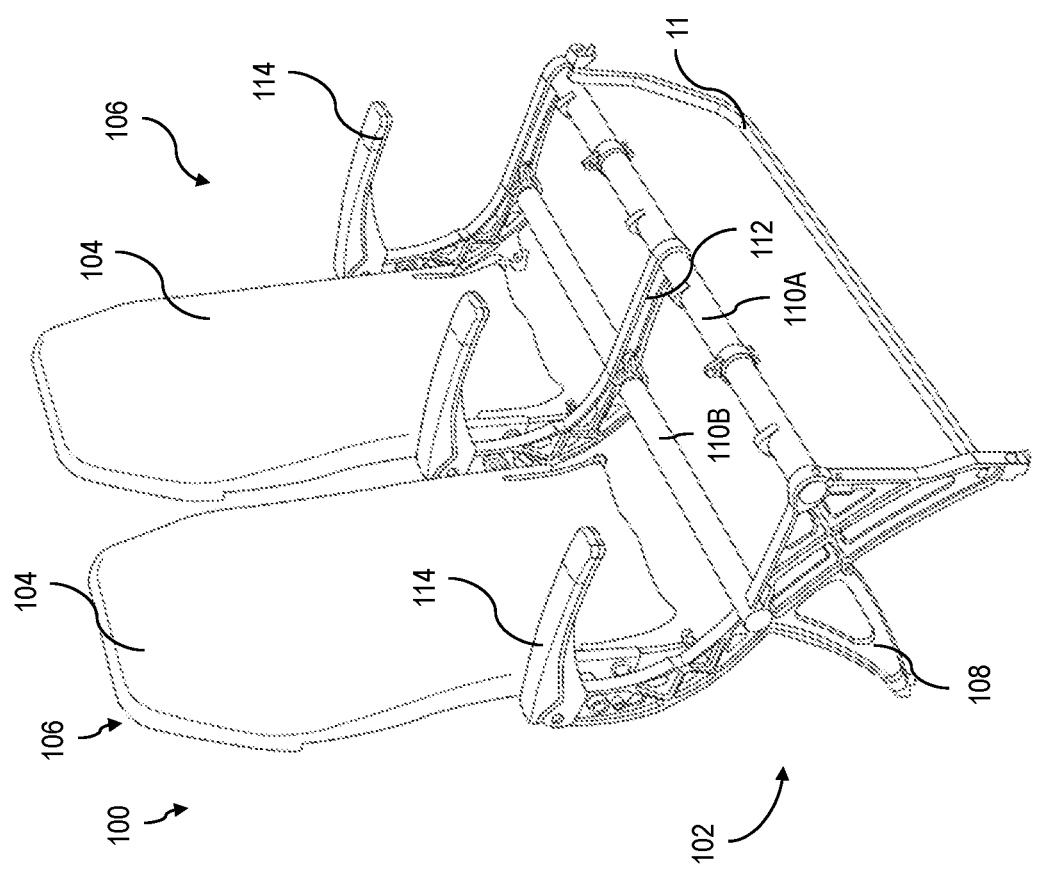
FIG. 1 is a perspective view of a generalized passenger seat assembly according to embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. Throughout this disclosure, a reference numeral with a letter refers to a specific instance of an element and the reference numeral without an accompanying letter refers to the element generically or collectively. Thus, as an example (not shown in the drawings), device "12A" refers to an instance of a device class, which may be referred to collectively as devices "12" and any one of which may be referred to generically as a device "12". In the figures and the description, like numerals are intended to represent like elements. As used herein, the meaning of "a," "an," and "the" includes singular and plural references unless the context clearly dictates otherwise.

The described embodiments of the invention provide leg assemblies for passenger seats. While the leg assemblies are discussed for use with aircraft seats, they are by no means so limited. Rather, embodiments of the leg assemblies may be used in passenger seats or other seats of any type or otherwise as desired.

FIG. 1 is a perspective view of a generalized passenger seat assembly 100 according to certain embodiments of the present invention. The passenger seat assembly includes a seat base frame assembly 102 and one or more seat back 104 supported relative to the seat base frame assembly 102. The number of seat backs 104 should not be considered limiting on the disclosure. In various examples, the number of seat backs 104 correspond with the number of passengers that the passenger seat assembly 100 is capable of carrying, and each seat back 104 and the corresponding portion of the seat base frame assembly 102 define a particular passenger seat 106. In the example of FIG. 1, the passenger seat assembly 100 is capable of carrying two passengers, and accordingly has two seat backs 104 and two passenger seats 106. However, in other examples, the passenger seat assembly 100 may be capable of carrying any desired number of passengers, such as one passenger, two passengers, three passengers, four passengers, or any other desired number of passengers. In these examples, the passenger seat assembly 100 can likewise have any desired number of corresponding seat backs 104.

The seat back 104 is connected to the seat base frame assembly 102, and is often pivotable relative to the seat base frame assembly 102 such that the seat back 104 can be positioned in various positions such as a taxi-takeoff-landing (TTL) position, a reclined position, etc.

The seat base frame assembly 102 of the passenger seat assembly 100 generally includes a leg assembly 108 and at least one base frame tube 110. In the embodiment illustrated, the seat base frame assembly 102 includes two base frame tubes 110A-B. The seat base frame assembly 102 may also include one or more additional components, including but not limited to one or more spreaders 112, one or more armrests 114, a luggage bar 116, one or more seat pans, sub-combinations thereof, and/or various other components or other components as desired.

Figure 2:
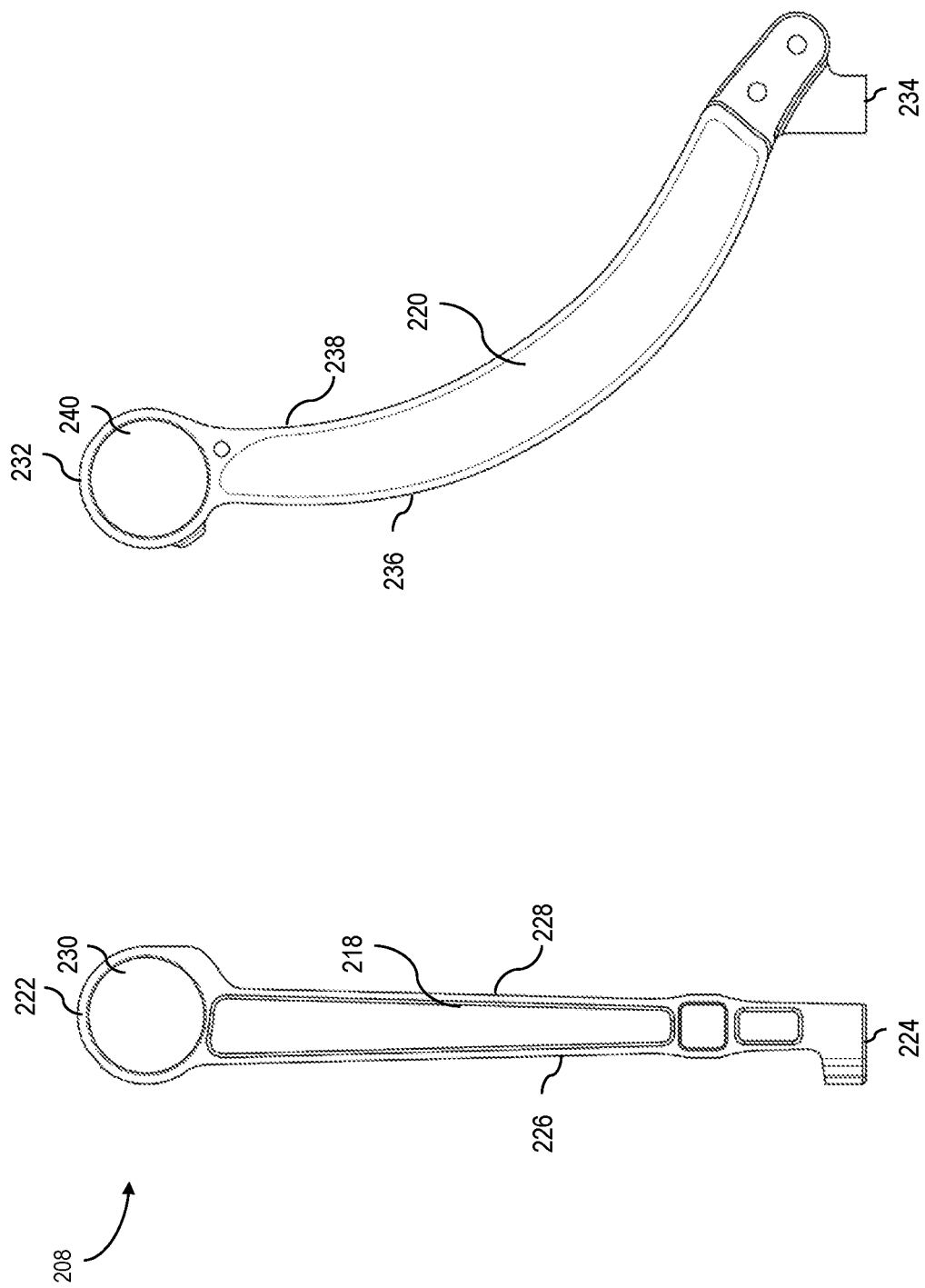
FIG. 2 is a side view of a leg assembly for a passenger seat assembly according to embodiments of the present invention.
Figure 3:
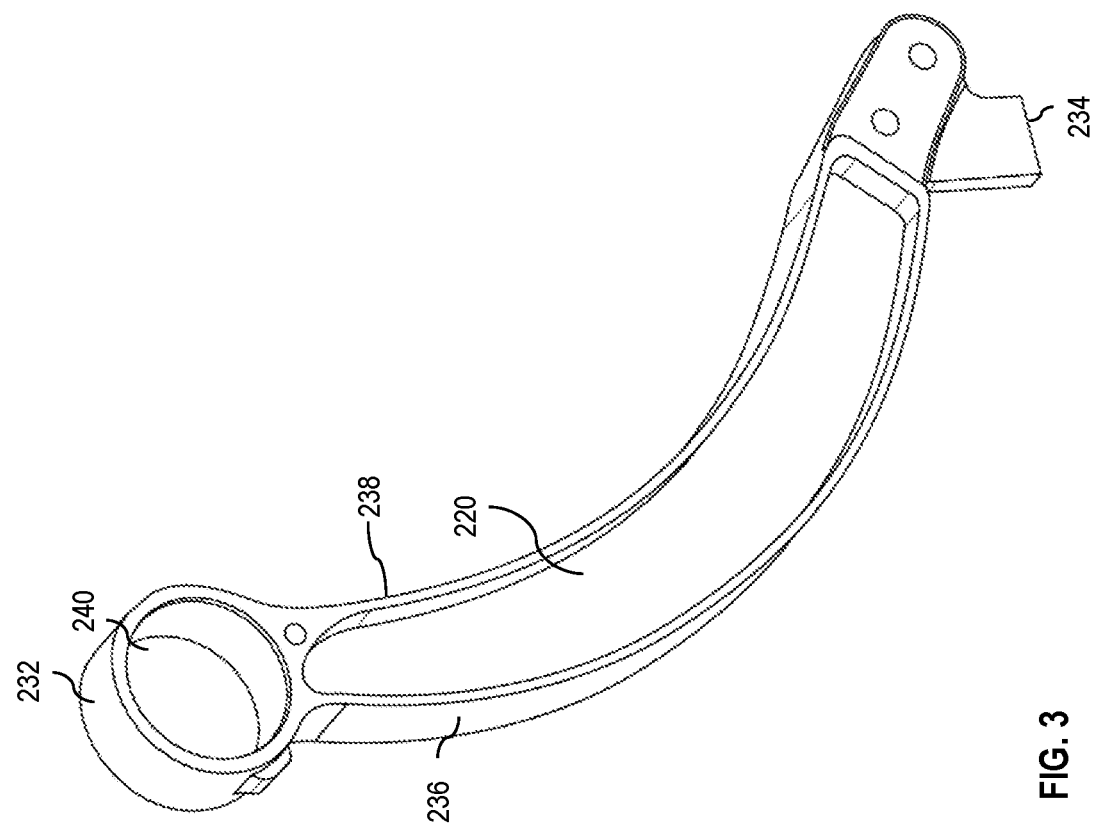
FIG. 3 is a perspective view of the leg assembly of FIG. 2.
Figure 3:
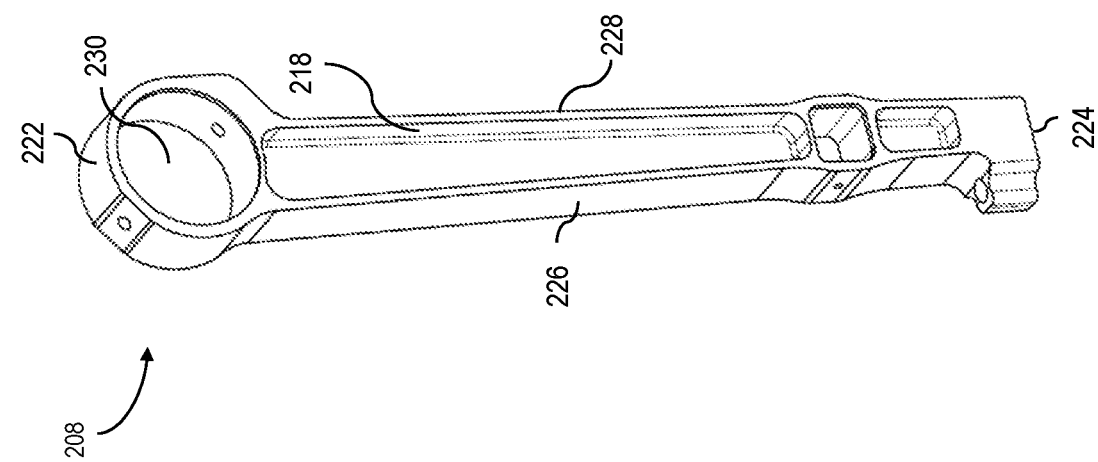

FIGS. 2 and 3 illustrate a leg assembly 208 according to various embodiments. In certain embodiments, the leg assembly 208 may be used with the passenger seat assembly 100 in place of the leg assembly 108. The leg assembly 208 includes a forward leg 218 and an aft leg 220. The forward leg 218 and the aft leg 220 may be constructed from various materials as desired. In some optional embodiments, the forward leg 218 and/or the aft leg 220 may be constructed from a metal including but not limited to aluminum, aluminum alloys, magnesium, magnesium alloys, titanium, steel, combinations thereof, and/or other materials or combinations of materials as desired. As discussed in detail below, compared to the single component leg assembly 108, the forward leg 218 and the aft leg 220 of the leg assembly 208 may not be directly connected to each other and/or the forward leg 218 and the aft leg 220 may be manufactured separately.

The forward leg 218 includes a top end 222, a bottom end 224, a forward side 226, and an aft side 228. In some embodiments, the bottom end 224 of the forward leg 218 is vertically aligned with the top end 222 of the forward leg 218, although it need not be in other embodiments. The forward leg 218 includes a forward aperture 230 adapted to receive the forward (or first) base frame tube 110A. In certain embodiments, the forward aperture 230 is at or proximate to the top end 222 of the forward leg 218. In various embodiments, a distance between the forward side 226 and the aft side 228 is a thickness of the forward leg 218. In some embodiments, the forward leg 218 has a non-uniform thickness between the top end 222 and the bottom end 224. In certain embodiments, the forward leg 218 has a maximum thickness at the forward aperture 230. In some optional embodiments, the aft side 228 at the forward aperture 230 is an aft-most portion of the forward leg 218.

The aft leg 220 includes a top end 232, a bottom end 234, a forward side 236, and an aft side 238. In certain embodiments, and as illustrated in FIGS. 2 and 3, the bottom end 234 is offset from the top end 232 in an aft direction relative to the top end 232. In some embodiments, the aft side 238 may be linear between the top end 232 and the bottom end 234; however, in other embodiments and as illustrated in FIGS. 2 and 3, the aft side 238 may have a non-linear curvature between the top end 232 and the bottom end 234. As such, the particular shape or profile of the aft side 238 should not be considered limiting.

The aft leg 220 includes an aft aperture 240 adapted to receive the aft (or second) base frame tube 110B. In certain embodiments, the aft aperture 240 is at or proximate to the top end 232 of the aft leg 220. In certain embodiments, a transverse dimension of the aft aperture 240 is the same as a transverse dimension of the forward aperture 230, although it need not be in other embodiments. In certain embodiments, the forward side 236 of the aft leg 220 at the aft aperture 240 is a forward-most portion of the aft leg 220.

In various embodiments, a distance between the forward side 236 and the aft side 238 of the aft leg 220 is a thickness of the aft leg 220. In certain embodiments, the thickness of the aft leg 220 at the aft aperture 240 is a maximum thickness of the aft leg 220. Optionally, the aft leg 220 has a uniform thickness between the aft aperture 240 and the bottom end 234, although it need not in other embodiments.

When assembled to form the leg assembly 208 for the passenger seat assembly, the aft side 228 of the forward leg 218 faces the forward side 236 of the aft leg 220. The forward leg 218 and the aft leg 220 are not directly connected to each other, and the forward leg 218 may be indirectly connected to the aft leg 220 via another non-leg assembly component. As some non-limiting examples, the forward leg 218 and the aft leg 220 may be indirectly connected via the spreaders 112 that are separately connected to the base frame tubes 110.

The leg assembly 208 with the disconnected forward leg 218 and aft leg 220 may provide various advantages or benefits. Compared to the single component leg assembly 108, the forward leg 218 and the aft leg 220 may be manufactured separately and allow for customization and/or modularity of the forward leg 218 and/or the aft leg 220. In certain embodiments, the omission of a component directly connecting the forward leg 218 with the aft leg 220 may improve or expand usable space under the passenger seat that a passenger may utilize (e.g., for luggage, feet, etc.). The improved leg assembly 208 may also provide a more compact and modular design, which provides cost and weight savings. In certain embodiments, front leg 218 and the aft leg 220 may improve modularity of the leg assemblies as a same front leg 218 may be used in different seat configurations (e.g., if the aft legs 220 are changed). In some embodiments, as mentioned, the curvature in the aft leg 220 may optionally be eliminated or minimized, which may provide cost and weight savings in the leg assembly 208. In various embodiments, the leg assembly 208 with disconnected forward legs 218 and aft legs 220 optionally may allow for different materials to be used to form each of the forward legs 218 and the aft legs 220 as desired. Various other benefits and advantages may be realized with the leg assemblies described herein, and the aforementioned advantages should not be considered limiting.

A collection of exemplary embodiments are provided below, including at least some explicitly enumerated as "Examples" providing additional description of a variety of example embodiments in accordance with the concepts described herein. These examples are not meant to be mutually exclusive, exhaustive, or restrictive; and the disclosure not limited to these example examples but rather encompasses all possible modifications and variations within the scope of the issued claims and their equivalents.

Example 1. A leg assembly for a passenger seat, the leg assembly comprising: a forward leg comprising a top end and a bottom end opposite the top end, wherein the top end comprises a forward aperture adapted to receive a first base frame tube of the passenger seat; and an aft leg comprising a top end, a bottom end, a forward side, and an aft side, wherein the top end comprises an aft aperture adapted to receive a second base frame tube of the passenger seat, wherein the forward side at the aft aperture of the aft leg is a forward-most portion of the aft leg, and wherein the aft leg is indirectly connected to the forward leg.

Example 2. The leg assembly of any of the preceding or subsequent examples or combination of examples, wherein a distance between the forward side and the aft side at the aft aperture is a maximum thickness of the aft leg.

Example 3. The leg assembly of any of the preceding or subsequent examples or combination of examples, wherein the bottom end of the aft leg is offset in an aft direction relative to the top end of the aft leg.

Example 4. The leg assembly of any of the preceding or subsequent examples or combination of examples, wherein the aft side of the aft leg is linear between the top end and the bottom end.

Example 5. The leg assembly of claim 3, wherein the aft side of the aft leg comprises a non-linear curvature between the top end and the bottom end.

Example 6. The leg assembly of any of the preceding or subsequent examples or combination of examples, wherein the forward leg further comprises a forward side and an aft side, wherein a distance between the forward side and the aft side at the forward aperture of the forward leg is a maximum thickness of the forward leg.

Example 7. The leg assembly of any of the preceding or subsequent examples or combination of examples, wherein the forward leg and the aft leg each comprise an aluminum alloy.

Example 8. The leg assembly of any of the preceding or subsequent examples or combination of examples, wherein the aft side of the aft leg comprises a non-linear curvature between the top end and the bottom end.

Example 9. The leg assembly of any of the preceding or subsequent examples or combination of examples, wherein the bottom end of the forward leg is vertically aligned with the top end of the forward leg.

Example 10. The leg assembly of any of the preceding or subsequent examples or combination of examples, wherein the aft leg comprises a uniform thickness between the aft aperture and the bottom end.

Example 11. The leg assembly of any of the preceding or subsequent examples or combination of examples, wherein a transverse dimension of the forward aperture is the same as a transverse dimension of the aft aperture.

Example 12. The leg assembly of any of the preceding or subsequent examples or combination of examples, wherein the forward leg comprises a non-uniform thickness between the top end and the bottom end.

Example 13. The leg assembly of any of the preceding or subsequent examples or combination of examples, wherein the aft leg comprises a non-uniform thickness between the aft aperture and the bottom end.

Example 14. A passenger seat comprising the leg assembly of any of the preceding or subsequent examples or combination of examples.

Example 15. The passenger seat of any of the preceding or subsequent examples or combination of examples, further comprising the first base frame tube, the second base frame tube, and a spreader coupled to the first based frame tube and the second base frame tube.

Example 16. A leg assembly for a passenger seat, the leg assembly comprising: a forward leg comprising a top end and a bottom end opposite the top end, wherein the top end comprises a forward aperture adapted to receive a first base frame tube of the passenger seat; and an aft leg comprising a top end, a bottom end, a forward side, and an aft side, wherein the top end comprises an aft aperture adapted to receive a second base frame tube of the passenger seat, wherein a distance between the forward side and the aft side at the aft aperture is a maximum thickness of the aft leg, and wherein the aft leg is indirectly connected to the forward leg.

Example 17. The leg assembly of any of the preceding or subsequent examples or combination of examples, wherein the bottom end of the aft leg is offset in an aft direction relative to the top end of the aft leg.

Example 18. The leg assembly of any of the preceding or subsequent examples or combination of examples, wherein the aft side of the aft leg is linear between the top end and the bottom end, or wherein the aft side of the aft leg comprises a non-linear curvature between the top end and the bottom end.

Example 19. A leg assembly for a passenger seat, the leg assembly comprising: a forward leg comprising a top end and a bottom end opposite the top end, wherein the top end comprises a forward aperture adapted to receive a first base frame tube of the passenger seat; and an aft leg comprising a top end, a bottom end, a forward side, and an aft side, wherein the top end comprises an aft aperture adapted to receive a second base frame tube of the passenger seat, wherein a distance between the forward side and the aft side at the aft aperture is a maximum thickness of the aft leg, and wherein the forward side at the aft aperture of the aft leg is a forward-most portion of the aft leg.

Example 20. A passenger seat comprising the leg assembly of any of the preceding or subsequent examples or combination of examples 9, the first base frame tube, the second base frame tube, and a spreader connecting the first base frame tube with the second base frame tube.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A leg assembly for a passenger seat, the leg assembly comprising:
   a forward leg comprising a top end and a bottom end opposite the top end, wherein the top end comprises a forward aperture with a closed perimeter, the forward aperture adapted to receive a first base frame tube of the passenger seat; and
   an aft leg comprising a top end, a bottom end, a forward side, and an aft side, wherein the top end comprises an aft aperture with a closed perimeter, the aft aperture adapted to receive a second base frame tube of the passenger seat, wherein, in a non-loaded configuration of the leg assembly, the forward side at the aft aperture of the aft leg is a forward-most portion of the aft leg, and wherein the aft leg is indirectly connected to the forward leg.

2. The leg assembly of claim 1, wherein a distance between the forward side and the aft side at the aft aperture is a maximum thickness of the aft leg.

3. The leg assembly of claim 1, wherein the bottom end of the aft leg is offset in an aft direction relative to the top end of the aft leg.

4. The leg assembly of claim 3, wherein the aft side of the aft leg is linear between the top end and the bottom end.

5. The leg assembly of claim 3, wherein the aft side of the aft leg comprises a non-linear curvature between the top end and the bottom end.

6. The leg assembly of claim 1, wherein the forward leg further comprises a forward side and an aft side, wherein a distance between the forward side and the aft side at the forward aperture of the forward leg is a maximum thickness of the forward leg.

7. The leg assembly of claim 1, wherein the forward leg and the aft leg each comprise an aluminum alloy.

8. The leg assembly of claim 1, wherein the aft side of the aft leg comprises a non-linear curvature between the top end and the bottom end.

9. The leg assembly of claim 1, wherein the bottom end of the forward leg is vertically aligned with the top end of the forward leg.

10. The leg assembly of claim 1, wherein a transverse dimension of the forward aperture is the same as a transverse dimension of the aft aperture.

11. The leg assembly of claim 1, wherein the forward leg comprises a non-uniform thickness between the top end and the bottom end.

12. The leg assembly of claim 1, wherein the aft leg comprises a non-uniform thickness between the aft aperture and the bottom end.

13. A passenger seat comprising the leg assembly of claim 1.

14. The passenger seat of claim 13, further comprising the first base frame tube, the second base frame tube, and a spreader coupled to the first based frame tube and the second base frame tube.

15. A passenger seat comprising:
   a forward base frame tube;
   an aft base frame tube;
   a spreader connecting the forward base frame tube with the aft base frame tube; and
   a leg assembly comprising:
      a forward leg comprising a top end and a bottom end opposite the top end, wherein the top end comprises a forward aperture for receiving the forward base frame tube of the passenger seat, the forward leg connected to the forward base frame tube at a location other than a location where the spreader is connected to the forward base frame tube; and
      an aft leg comprising a top end, a bottom end, a forward side, and an aft side, wherein the top end comprises an aft aperture for receiving the aft base frame tube of the passenger seat, wherein a distance between the forward side and the aft side at the aft aperture is a maximum thickness of the aft leg, and wherein the aft leg is detached from the forward leg and connected to the aft base frame tube at a location other than a location where the spreader is connected to the aft base frame tube.

16. The leg assembly of claim 15, wherein the bottom end of the aft leg is offset in an aft direction relative to the top end of the aft leg.

17. The leg assembly of claim 16, wherein the aft side of the aft leg is linear between the top end and the bottom end, or wherein the aft side of the aft leg comprises a non-linear curvature between the top end and the bottom end.

18. A passenger seat comprising:
   a forward base frame tube;
   an aft base frame tube;
   a spreader connecting the forward base frame tube with the aft base frame tube; and
   a leg assembly for a passenger seat, the leg assembly comprising:
      a forward leg comprising a top end and a bottom end opposite the top end, wherein the top end comprises a forward aperture adapted to receive the forward base frame tube of the passenger seat, the forward leg connected to the forward base frame tube at a location other than a location where the spreader is connected to the forward base frame tube; and an aft leg comprising a top end, a bottom end, a forward side, and an aft side, wherein the top end comprises an aft aperture adapted to receive the aft base frame tube of the passenger seat, wherein a distance between the forward side and the aft side at the aft aperture is a maximum thickness of the aft leg, and wherein the forward side at the aft aperture of the aft leg is a forward-most portion of the aft leg, wherein the aft leg is disconnected from the forward leg and connected to the aft base frame tube at a location other than a location where the spreader is connected to the aft base frame tube.

\* \* \* \* \*